E. E. NOVOTNY.
SOUND RECORD.
APPLICATION FILED NOV 2, 1920.

1,398,148. Patented Nov. 22, 1921.

Inventor
Emil E. Novotny,
By his Attorneys
Meyers, Cavanagh & Hyde

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

SOUND-RECORD.

1,398,148.    Specification of Letters Patent.    Patented Nov. 22, 1921.

Application filed November 2, 1920. Serial No. 421,315.

*To all whom it may concern:*

Be it known that I, EMIL E. NOVOTNY, a citizen of the United States, and resident of Logan, in the county of Philadelphia and State of Pennsylvania, have invented certain new and useful Improvements in Sound-Records, of which the following is a specification.

This invention relates to the manufacture of sound records, and has particular application to articles of this class molded from a synthetic resin, or a composition containing synthetic resin. In the present instance I use synthetic resin, in the nature of a phenolic condensation product, which contains furfurol, or a derivative of the latter, such as furfuramid, as an ingredient.

By the use of a phenolic condensation product containing furfurol, or a derivative thereof, for the manufacture of sound records, I attain certain advantages when compared with the phenol-formaldehyde condensation products heretofore used in making the records. I have found by experience that the furfurol phenolic condensation product reacts with great speed, which is a distinct advantage in the attainment of economic molding conditions. Furthermore a sound record made of this material will present an exceedingly attractive appearance, as it exhibits a deep, jet black, highly polished surface, and this without the addition or use of any dye, pigment or coloring matter whatsoever. When molded the surface of the record made from this material is so hard and glossy that the hissing or grinding noise commonly incident to the use of records now on the market is entirely eliminated and full clear over and under tones will be reproduced. This material is also readily separable from a metal matrix, after the molding operation, and consequently the liability of the record sticking or clinging to the matrix is obviated and the danger of destroying the face of the record is thereby avoided. A record made from this furfurol-phenol product, under heat reaction, will set to a hard, tenacious and infusible form so that it can be easily removed from the mold or matrix while still in a heated condition, and without impairing the gloss, finish, dimensions or shape of the molded record.

Figure 1:
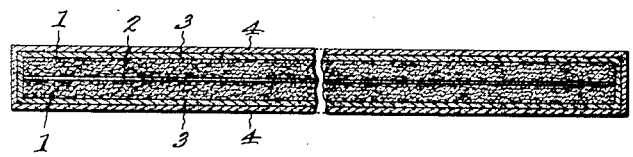
Figure 1, is a cross sectional view taken through a double faced composite blank or tablet employed in the making of my sound record.

In making my record I prefer to use the double faced blank such as is shown in Fig. 1. This blank is preferably made up of a series of imposed laminations or sheets of long-fibered absorbent material, such as chip board, straw board, paper cloth or the like, these laminations or sheets being indicated at 1. These fiber sheets 1, which constitute the body or base of the record, are impregnated with the furfurol-phenol condensation product, and are cemented together as at 2 by any suitable adhesive, such as the furfurol-phenol varnish. The laminated fiber body thus formed is coated, preferably on both faces, with a layer 3 of a synthetic resin containing furfurol, or a derivative thereof, and upon each of these coatings 3 I preferably apply a second or surface coating 4 of a similar material. As hereinafter described, the intermediate or inner coatings 3 are harder and more brittle, but less tenuous than the surface coatings 4, the latter containing a richer mixture of phenolic condensation product.

In impregnating the fiber sheets 1, I preferably proceed as follows: I prepare a bath of liquid synthetic resin or varnish by mixing, by weight, 100 parts of phenol to 15 to 40 parts of furfurol and 5 to 10 parts of hydrochloric acid of about 39% strength, the acid being employed as a catalyst. The reaction of the materials of this mixture will result in the formation of a fusible resin or gum, and to make the varnish, such resin or gum is dissolved in alcohol, acetone, or other suitable solvent, using about 3 parts of solvent to 1 part of the resin or gum. I also add to the gum, either before or after it is put in the solvent, a suitable hardening agent, preferably hexa-methylene-tetramin, in the proportions, of from 5 to 20% by weight of the hardening agent to the weight of the fusible gum being treated. As a hardening agent I may employ other substances, such as an additional amount of furfurol, or the furfurol derivative.

Should the additional amount of furfurol be used for the hardening agent, a small amount of catalyst, such as ammonia, should be added, but where the derivative furfuramid is used it is not necessary to add this catalyst, as furfuramid itself contains ammonia. The fiber sheets are subjected to this bath, by dipping, soaking, or otherwise, and are then passeed through a wringer, or drained, to remove and to salvage any excess solutions. The sheets are then subjected to the drying action of heat in an oven, for a sufficient length of time to eliminate substantially all of the moisture, and to dry the sheets. When the sheets have been dried they will be found to be of a crisp, compressible nature, with the cells impregnated with non-flowing, partially reacted, synthetic resin or gum. The sheets may then be cemented together with layers of the synthetic resin varnish, made as above described, and heat and pressure applied to partially harden the cement and to cause an intimate union of the laminations or sheets.

The body thus formed is now coated, preferably upon both faces, with the layers 4 of the synthetic resin product. These layers 4 are intended to constitute intermediate barrier layers to prevent penetration of the material of the surface layers into the fibrous body, as during the molding operation, and also in the complete record to form sound repelling layers to avoid the absorption of over-tones or under-tones by the fiber body. Therefore it is desirable to make these barrier layers 4 as hard and infusible as possible. To accomplish this I make the synthetic resin product of the layers from a mixture composed of the resin or gum used for making the solution with which the fiber sheets are impregnated, but I add to this resin or gum barium sulfate and alcohol, for example, in the proportions of 1 part of gum to 4 parts of barium sulfate and 2 parts of alcohol, the mixture being suitably ground in a ball mill to reduce it to the consistency of a thick paint. I then apply this thick paint-like mixture to form the coatings 4, and then dry the laminated sheet so coated in an oven, to eliminate moisture and the solvents, and to cause a partial reaction or partial hardening and setting of these coats 4 so that they will assume a non-flowing condition yet will be capable of being molded. At the same time this heating will result in further partially hardening the impregnated synthetic resin of the laminations or fibrous sheets. The blank is then ready for the application of the final or surface coatings 5. These coatings are also made from the furfurol containing synthetic resin or products heretofore described, but in the case of these outer coatings I omit the use of the barium sulfate and preferably substitute therefor a filler such as lamp black, using a mixture composed of 1 part of the synthetic resin or gum, 1 part filler, and 2 parts alcohol. This is also ground in the ball mill and will produce a thick varnish, which when hardened and set to infusible form will be more tenuous and skinlike but less hard and brittle than the barrier layers 4. The blank as thus finally coated is again subjected to the action of heat in the oven, to drive off moisture, to dry the blank, and to partially harden and set the outer or surface coatings 5 so that the latter will assume a non-flowing, skinlike form possessing a certain degree of tenacity and stretch, and capable of taking a molding impression. If desired I may omit the lamp black filler as a constituent of the surface coating as I have obtained excellent results without the use of such filler.

The blank or tablet thus formed may be said to be in a "pre-cooked" state and is now ready for use in making the sound record.

Figure 2:
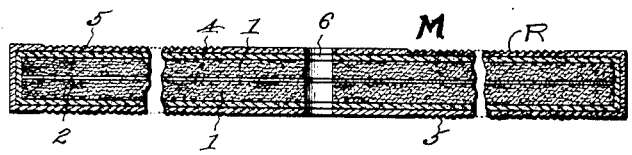
Fig. 2, is a cross sectional view taken through a finished record made from a blank or tablet such as shown in Fig. 1.
Figure 3:
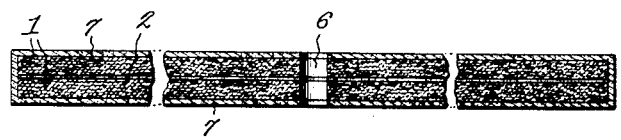
Fig. 3, is a cross sectional view taken through a blank or tablet having a single faced coating at each side thereof.

In manufacturing the double-faced sound record M shown in Fig. 2 the blank of Fig. 1 is used. The blank is interposed between a pair of ordinary metallic matrices or punches with the center hole 6 of the blank alining with the usual central holes of the matrices, a stud passing through the alining openings for holding the matrices and the interposed blank in proper position. The assembled matrices and blank are then placed in a suitable press and heated to a suitable operating temperature, or say from 250 to 350 degrees F. or sufficient to slightly soften the skinlike faces 5 of the blank and to cause the sound grooves to be impressed in the faces of the blank. It is not necessary to cool, or to maintain pressure for any extended length of time, inasmuch as the record blank has been pre-cooked and compacted or pressed into sheet-like form prior to use for making the record. Therefore from 1 to 5 minutes is usually sufficient for molding the sound record. It is also unnecessary to employ side bearers to prevent lateral flow or side pressure of the sound record blank, because the latter has no tendency to side flow but under pressure the fiber will compress in the depressions of the matrices and produce accurate details. After the molding or pressing of the sound record is completed, the press is opened, the sound record removed, and it will appear as shown in Fig. 2, with sharp, regular sound grooves R on each face, thus insuring the production of strong, full and clear tones. During the heating and molding of the record the phenolic condensation product of the blank has assumed its final, hard and substantially infusible form, or a form hard enough for all ordinary purposes without further treatment, but should it be desirable to produce an exceedingly hard and infusible record this may be done by subjecting the latter, after removal from the matrix, to additional heat or heat and light pressure. In some instances the sound record blank, and consequently the sound record, may be made with but a single layer of skinlike material as shown at 7 in Fig. 3, and this single layer may be applied to both faces, or to but one face as may be desired, and I might also state that the fibrous material need not be impregnated with the condensation product, but unimpregnated fiber sheets may be used if desired. However, I much prefer to employ the impregnated fiber sheets and the double coated faces for the blank, as a much more satisfactory and far stronger article results. While I have in Fig. 2 shown a double faced record, it will be obvious that the sound reproducing grooves may be formed in but one face, thus forming a single faced record.

Where I have herein used the term "furfurol," I wish it to be understood as including not only furfurol itself but also any derivatives thereof suitable for my purpose, such as furfuramid, and where I have herein used the term "phenol," I wish this to be understood as including such substances as cresol, resorcinol and naphthol, or materials possessing similar characteristics and capable of being used in the making of an infusible synthetic resin.

In making my furfurol synthetic resin, instead of combining furfurol with the phenol in the initial stage of the formation of the substance I may make a fusible resin of phenol and formaldehyde, in the proportions by weight of 100 parts of phenol to 55 parts of formaldehyde and treat this mixture with furfurol, or furfuramid as a hardening agent, using in the proportions of from 8 to 40% by weight to the weight of the gum being treated. I may also make a fusible synthetic resin by the action of acetaldehyde or paraldehyde with phenol in the proportions by weight of 100 parts of phenol to 37 parts of the acetaldehyde or paraldehyde treated with a catalyst such as hydrochloric acid in the proportion of ½ of 1% by weight of the catalyst to the weight of the mixture being treated. The resultant fusible gum is then treated with from 15 to 40 parts of furfurol or furfuramid as the hardening agent. In every instance, however, it will be noted that in making the synthetic resin of the record I resort to the use of furfurol or a derivative thereof such as furfuramid.

Where I have herein in the description and claims used the expresion "furfurol synthetic resin" I wish this to be understood as signifying a synthetic resin wherein furfurol is or was used as a constitutent in making the product, and therefore, although in the manufactured record the synthetic resin is in its final reacted state, the above mentioned expressions is to be taken as including the product in such final state.

What I claim is:

1. As a new article of manufacture, a grooved sound record including a composition comprising a furfurol synthetic resin.

2. As a new article of manufacture, a grooved sound record comprising a body portion surfaced with a composition comprising a furfurol synthetic resin.

3. As a new article of manufacture, a sound record comprising a body portion having a composition comprising a furfurol synthetic resin incorporated therein, said record having sound grooves formed in a face thereof.

4. As a new article of manufacture, a sound record comprising a body portion and a plurality of coatings of a composition comprising a furfurol synthetic resin applied thereto, one of said coatings having sound grooves formed therein.

5. As a new article of manufacture, a sound record comprising a body portion, a barrier coat applied to the body portion, and a grooved surface coating of a composition comprising a furfurol synthetic resin applied to the barrier coat.

6. As a new ariticle of manufacture, a sound record comprising a fiber sheet impregnated with a furfurol synthetic resin, and with grooved furfurol synthetic resinous coating for the fiber sheet.

7. As a new article of manufacture, a sound record comprising a porous body having sound grooves formed in the face thereof, said body containing infusible synthetic resin composed of reacted phenol, furfurol and a methylene hardening agent.

8. As a new article of manufacture, a sound record having a grooved face, said record containing an infusible synthetic resin composed of reacted phenol, furfurol and hexa-methylene-tetramin as a hardening agent.

9. As a new article of manufacture, a sound record comprising the body portion, and a plurality of synthetic resinous coatings applied to one face thereof, one of said coatings comprising a furfurol synthetic resin.

Signed at Philadelphia, in the county of Philadelphia and State of Pennsylvania, this 28th day of October A. D. 1920.

EMIL E. NOVOTNY.